(12) United States Patent
Chaplin

(10) Patent No.: US 10,767,310 B2
(45) Date of Patent: Sep. 8, 2020

(54) COMPOSITE FORMING FABRIC

(71) Applicant: AstenJohnson, Inc., Charleston, SC (US)

(72) Inventor: Derek Chaplin, Ottawa (CA)

(73) Assignee: AstenJohnson, Inc., Charleston, SC (US)

( * ) Notice: Subject to any disclaimer, the term of this patent is extended or adjusted under 35 U.S.C. 154(b) by 177 days.

(21) Appl. No.: 15/750,641

(22) PCT Filed: Aug. 7, 2017

(86) PCT No.: PCT/US2017/045693
§ 371 (c)(1),
(2) Date: Feb. 6, 2018

(87) PCT Pub. No.: WO2018/031447
PCT Pub. Date: Feb. 15, 2018

(65) Prior Publication Data
US 2019/0338464 A1 Nov. 7, 2019

Related U.S. Application Data

(60) Provisional application No. 62/372,948, filed on Aug. 10, 2016.

(51) Int. Cl.
*D21F 7/08* (2006.01)
*B32B 5/02* (2006.01)
*B32B 5/26* (2006.01)

(52) U.S. Cl.
CPC .............. *D21F 7/083* (2013.01); *B32B 5/024* (2013.01); *B32B 5/26* (2013.01); *B32B 2262/062* (2013.01)

(58) Field of Classification Search
CPC ........... D21F 7/083; B32B 5/26; B32B 5/024; B32B 2262/062
See application file for complete search history.

(56) References Cited

U.S. PATENT DOCUMENTS

| 5,826,627 | A | 10/1998 | Seabrook et al. |
| 2008/0035230 | A1 | 2/2008 | Danby et al. |
| 2008/0105323 | A1 | 5/2008 | Hay et al. |
| 2008/0169040 | A1 | 7/2008 | Barrett |

FOREIGN PATENT DOCUMENTS

AU  769189  1/2004

*Primary Examiner* — Elizabeth C Imani
(74) *Attorney, Agent, or Firm* — Volpe and Koenig, P.C.

(57) ABSTRACT

A composite forming fabric for a papermaking machine woven according to a repeating fabric weave pattern is provided. The fabric includes a paper side (PS) layer having a PS surface, with the PS layer including PS warps and PS wefts interwoven in a first repeating pattern, and a machine side (MS) layer having a MS surface, with the MS layer including interwoven MS warps and MS wefts. A plurality of pairs of binder weft yarns each including first and second binder weft yarns that are interwoven with the PS warps and the MS warps to bind the PS and MS layers together in the composite forming fabric. In each pattern repeat of the fabric weave pattern at least three of the MS warps pass under each MS weft, where said at least three of the MS warps are co-located adjacent to one another with a further one of the MS warps separating a first of the at least three warps from the others of said at least three warps, and each of the MS warps interlaces with at least two non-adjacent ones of the MS wefts.

10 Claims, 4 Drawing Sheets

FIG. 1

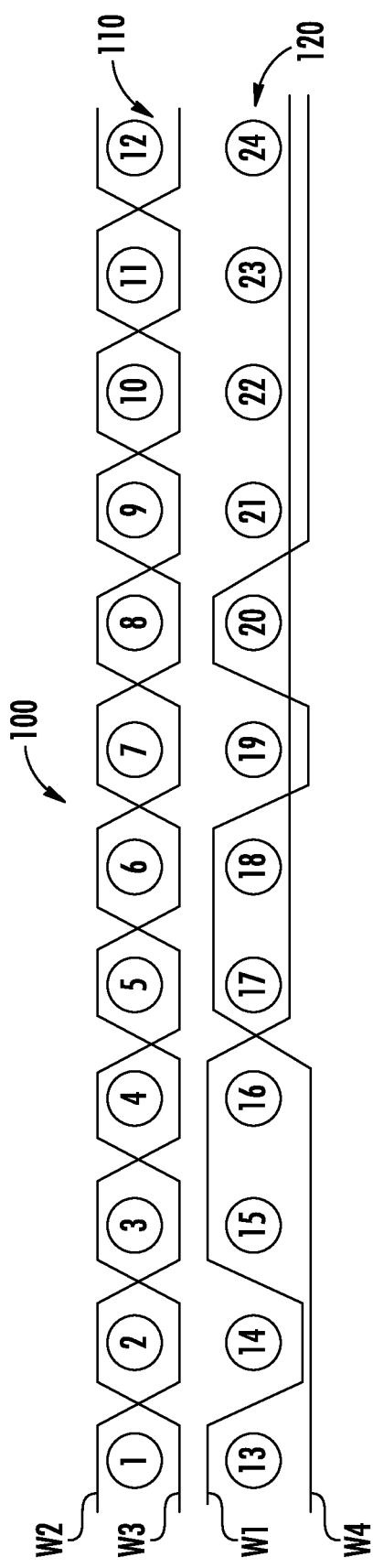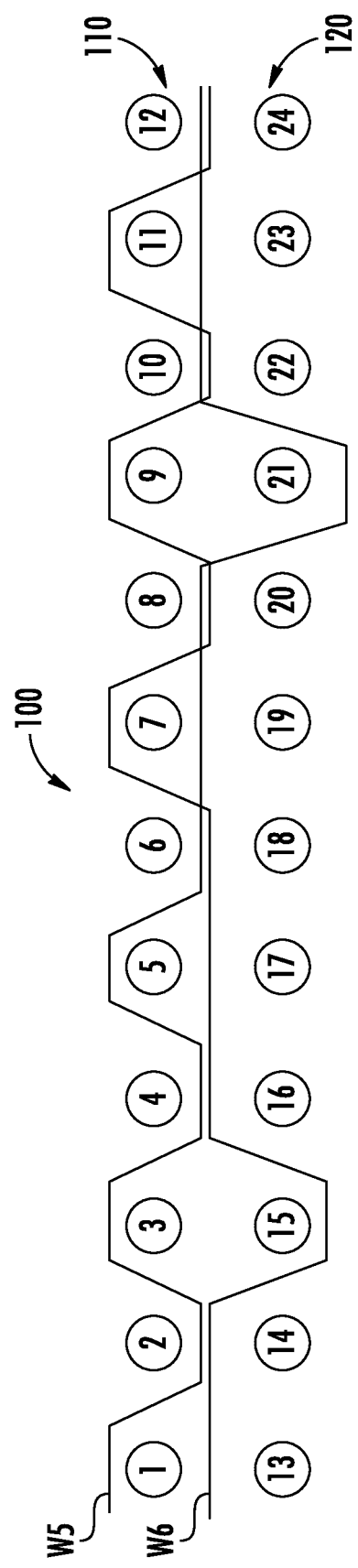

FIG. 4

| SHOT # | SHED NUMBER ||||||||||||||||||||||||| WEFT |
|---|---|---|---|---|---|---|---|---|---|---|---|---|---|---|---|---|---|---|---|---|---|---|---|---|---|
| | PS LAYER WARPS |||||||||||| MS LAYER WARPS |||||||||||| |
| - | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | - |
| W1 | 1 | 2 | 3 | 4 | 5 | 6 | 7 | 8 | 9 | 10 | 11 | 12 | | 14 | | | 17 | 18 | 19 | 20 | 21 | 22 | 23 | 24 | M |
| W4 | 1 | 2 | 3 | 4 | 5 | 6 | 7 | 8 | 9 | 10 | 11 | 12 | 13 | 14 | 15 | 16 | | | 19 | | 21 | 22 | 23 | 24 | M |
| W7 | 1 | 2 | 3 | 4 | 5 | 6 | 7 | 8 | 9 | 10 | 11 | 12 | | 14 | 15 | 16 | 17 | 18 | 19 | 20 | 21 | | 23 | | M |
| W10 | 1 | 2 | 3 | 4 | 5 | 6 | 7 | 8 | 9 | 10 | 11 | 12 | 13 | | | 16 | | 18 | 19 | 20 | 21 | 22 | 23 | 24 | M |
| W13 | 1 | 2 | 3 | 4 | 5 | 6 | 7 | 8 | 9 | 10 | 11 | 12 | 13 | 14 | 15 | 16 | 17 | 18 | 19 | 20 | | | 23 | 24 | M |
| W16 | 1 | 2 | 3 | 4 | 5 | 6 | 7 | 8 | 9 | 10 | 11 | 12 | 13 | | 15 | 16 | 17 | 18 | 19 | 20 | 21 | 22 | | | M |
| W19 | 1 | 2 | 3 | 4 | 5 | 6 | 7 | 8 | 9 | 10 | 11 | 12 | 13 | 14 | 15 | | 17 | | | 20 | 21 | 22 | 23 | 24 | M |
| W22 | 1 | 2 | 3 | 4 | 5 | 6 | 7 | 8 | 9 | 10 | 11 | 12 | 13 | 14 | 15 | 16 | 17 | 18 | 19 | | | 22 | | 24 | M |

WEFTS

FIG. 5

COMPOSITE FORMING FABRIC

This application is a 371 of PCTUS17/45693.

FIELD OF THE INVENTION

The invention concerns composite forming fabrics for use in forming the initial embryonic web in a papermaking process. It is particularly concerned with composite forming fabrics comprised of two independent woven layers interconnected by pairs of binder weft yarns that together form two segments in each repeat of the binder weft pattern.

BACKGROUND OF THE INVENTION

The invention concerns a forming fabric weave design having two independent woven layers which are interconnected during weaving by a plurality of binder weft yarns. The binder yarns are woven as pairs such that, while a first pair member forms (or completes) the continuous unbroken weave pattern of the of non-binding weft yarns in the paper side (PS) layer, the second member interlaces with at least one warp yarn from the machine side (MS) layer so as to bind that layer to the PS layer. The pair members then exchange position (being directed during weaving from one layer to the other) so that the second member then continues the PS layer weave pattern so that it is unbroken and continuous while the first interlaces with a second, different warp yarn from the MS layer. Each exchange forms a segment of the continuous unbroken PS weave pattern. Such fabrics are known and have been described in U.S. Pat. No. 5,826,627 (Seabrook et al.) and others. Each binder yarn is said to be "intrinsic" in that it contributes to and is part of the PS surface pattern; additionally, each contributes to the interconnection of the PS and MS layers. Fabrics of this type are known as "SSB" or "sheet support binder" type forming fabrics in the papermaking arts.

While satisfactory in many respects, there is always a desire to improve on or provide an alternative to what has been done previously. The present invention is directed to resolving some of the shortcomings of the known prior art fabrics, particularly with respect to fabric stability, increased wear, and ease of seaming, which is typically accomplished by unweaving and reweaving two machine direction (MD) ends together to form a continuous fabric loop without a visible seam.

In the known SSB fabrics, the PS and MS woven layers are interconnected solely by the interweaving of the binder yarns. Each binder yarn of a pair typically interlaces at least once with the yarns of the PS and MS layers in each repeat of the binder weft pattern; each binder yarn also typically forms one segment of the PS weave pattern between exchanges with its pair member. "Binder weft pattern" refers to one repeat of the interweaving pattern of a binder yarn pair used to interconnect the PS and MS layers together as a single fabric construction while forming the PS weave pattern.

SUMMARY

A composite forming fabric for a papermaking machine woven according to a repeating fabric weave pattern is provided. The fabric includes a paper side (PS) layer having a PS surface, with the PS layer including PS warps and PS wefts interwoven in a first repeating pattern, and a machine side (MS) layer having a MS surface, with the MS layer including interwoven MS warps and MS wefts. A plurality of pairs of binder weft yarns is provided, with each of the pairs of binder weft yarns comprising first and second binder weft yarns that are interwoven according to a binder weft pattern with the PS warps and the MS warps to bind the PS and MS layers together in the composite forming fabric, and each interchanges between the layers at exchange points. In each pattern repeat of the fabric weave pattern:

(a) at least three of the MS warps pass under each MS weft, where said at least three of the MS warps are co-located adjacent to one another with a further one of the MS warps separating a first of the at least three warps from the others of said at least three warps, and (b) each of the MS warps interlaces with at least two non-adjacent ones of the MS wefts.

In one preferred arrangement, in each pattern repeat of the fabric weave pattern no two of the MS warps interlace with a same two of the MS wefts.

In one arrangement, each of the binder weft yarns in the pairs of binder weft yarns interlace with only one MS warp yarn in each said pattern repeat of the fabric. However, the each of the binder weft yarns in the pairs of binder weft yarns can interlace with two or three of the MS warp yarns in each said pattern repeat of the fabric.

Preferably, an interweaving pattern of each of the binder weft yarn pairs in the PS layer forms a part of the first repeating pattern.

In one arrangement, the number of MS warp yarns in one said pattern repeat of the fabric weave pattern is the same as a number of PS warp yarns in the same pattern repeat.

In a preferred arrangement, a ratio of a number of PS weft yarns, including allowing for pairs of the binder weft yarns, to a number of MS weft yarns is in a range from 1:1 to 5:2 in one said pattern repeat of the fabric weave pattern.

The cross-sectional shape of at least some of the warps, the wefts, and/or the binder yarns is selected from one of: generally circular, ovate, elliptical, square or rectangular. In some preferred arrangements, the PS warps are rectangular or ovate and the MS warps are also rectangular or ovate.

Fabrics made in accordance with the teachings of the invention will be heatset, processed, seamed, and finished in a manner using techniques and equipment similar to that used with other known SSB type fabrics.

BRIEF DESCRIPTION OF THE SEVERAL VIEWS OF THE DRAWINGS

The foregoing summary as well as the following detailed description will be best understood when read in conjunction with the appended drawings. In the drawings:

FIG. 1 is a weave diagram of a SSB fabric according to a first embodiment of the invention, FIG. 2 is a cross-sectional schematic view through the warp yarns of the fabric of FIG. 1 showing the weave paths of the first four weft yarns, FIG. 3 is a cross-sectional schematic view through the warp yarns of the fabric of FIG. 1 showing the weave paths of the fifth and sixth weft yarns that form the first binder pair of weft yarns, FIG. 4 is a partial weave diagram showing the paper side surface of the fabric of FIG. 1, and FIG. 5 is a partial weave diagram showing one repeat of the bottom layer weave of the fabric of FIG. 1.

DETAILED DESCRIPTION OF THE PREFERRED EMBODIMENTS

Figure 1:
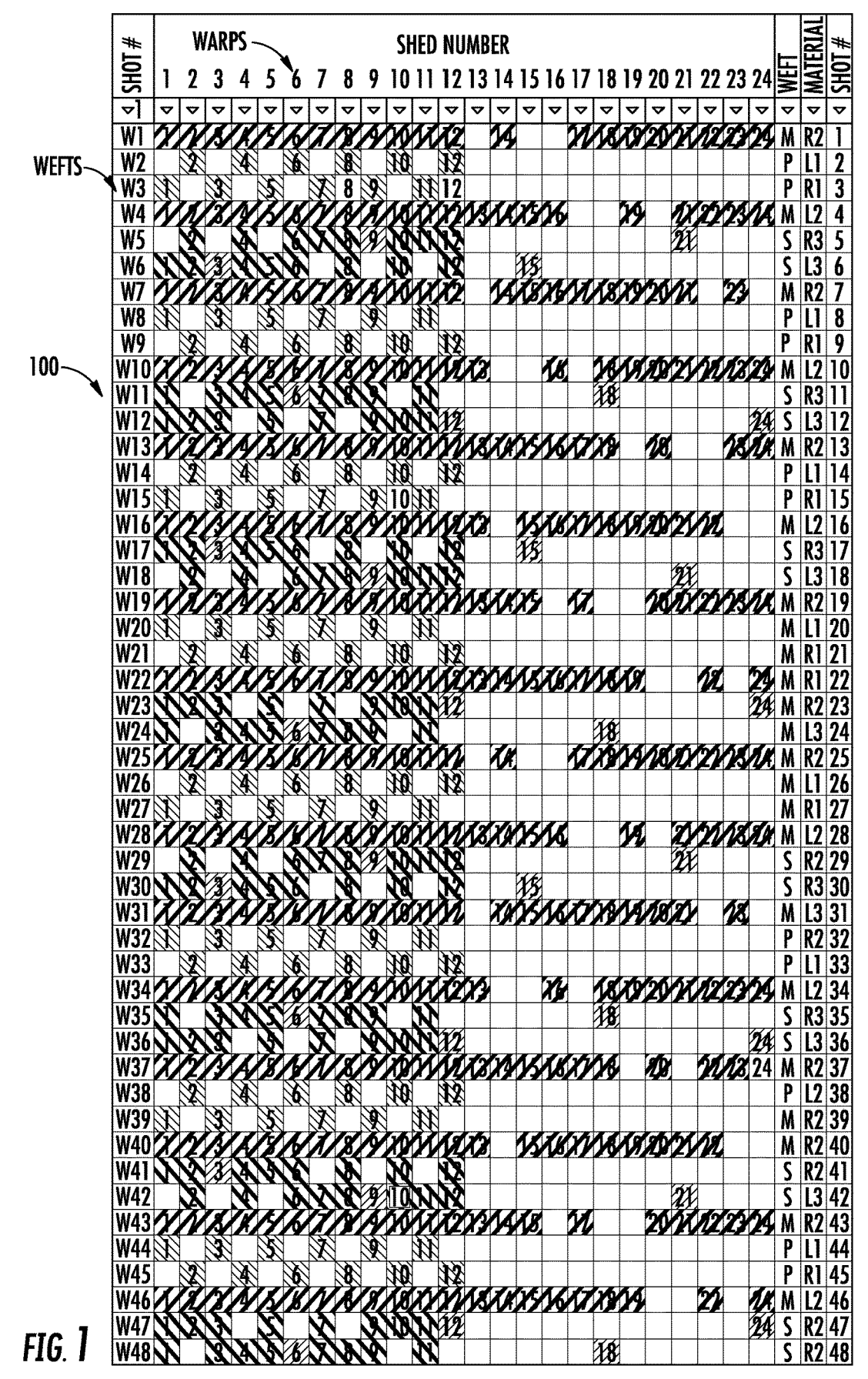

FIG. 1 is a weave diagram of a fabric 100 shown in cross-section in FIGS. 2 and 3. The warp yarns are numbered 1 to 24 across the top of the diagram and the weft yarns are numbered W1 to W48 along the left side of the diagram. Locations where a weft yarn passes over a warp yarn are indicated by a white (blank) square in the pattern. The fabric 100 includes a paper side (PS) layer 110 having a PS surface, with the PS layer 110 including the PS warps 1 to 12 and non-binding PS weft yarns W2, W3, W8, W9, W14, W15, W20, W21, W26, W27, W32, W33, W38, W39, W44, and W45 (indicated as wefts "P" at the right side of the weave diagram) interwoven in a first repeating pattern, and a machine side (MS) layer 120 having a MS surface, with the MS layer 120 including interwoven MS warps 13 to 24 and non-binding MS wefts W1, W4, W7, W10, W13, W16, W19, W22, W25, W28, W31, W34, W37, W40, W43, and W46 (indicated as wefts "M" at the right side of the weave diagram). A plurality of pairs of binder weft yarns is provided, with each of the pairs of binder weft yarns comprising first and second binder weft yarns W5, W6; W11, W12; W17, W18; W23, W24; W29, W30; W35, W36; W41, W42; W47, W48 (indicated as wefts "S" at the right side of the weave diagram) that are interwoven according to a binder weft pattern with the PS warps 1-12 and the MS warps 13-24 to bind the PS and MS layers 110, 120 together in the composite forming fabric 100.

In FIG. 2, the interweaving pattern of the first two PS weft yarns W2, W3 as well as the first two MS weft yarns W1, W4 with the PS warps 1-12 and the MS warps 13-24 are shown. The PS weft yarns W2, W3 interweave with the PS warp yarns 1-12 in a plain weave as per the weave diagram in FIG. 1. However, other weaves such as a twill or broken twill could be used. The MS wefts W1, W4 have long floats on the MS surface of the fabric 100. In the illustrated embodiment, the floats are under 8 of the MS warps 13-24.

In order to achieve the benefits of the present fabric 100, in each weave repeat, at least three, and preferably only three, of the MS warps 13-24 pass under each MS weft W1, W4, W7, W10, W13, W16, W19, W22, W25, W28, W31, W34, W37, W40, W43, and W46, where the at least three of the MS warps 13-24 are co-located adjacent to one another with a further one of the MS warps 13-24 separating a first of the at least three warps from the others of said at least three warps. This can be seen for MS weft W1 in FIG. 2 where the three MS warps 13, 15, 16 are grouped together with the first MS warp 13 of this group being separated from the other MS warps 15, 16 of this group by a further one of the MS warps 14. The same is true for each of the MS weft locations.

Further, each of the MS warps 13-24 interlace with at least two, and preferably only two, non-adjacent ones of the MS wefts W1, W4, W7, W10, W13, W16, W19, W22, W25, W28, W31, W34, W37, W40, W43, and W46. This is seen most easily in FIG. 5 which shows the MS weave diagram for the fabric 100 extracted from the weave diagram of FIG. 1.

In a preferred arrangement, in each pattern repeat of the fabric weave pattern no two of the MS warps 13-24 interlace with a same two of the MS wefts W1, W4, W7, W10, W13, W16, W19, W22, W25, W28, W31, W34, W37, W40, W43, and W46. This arrangement provides benefits in wear, due to the long MS weft floats, as well as easier seaming since during un-weaving and reweaving of the fabric 100 ends to form a fabric loop, the exposed MS warps are held with higher stability since they do not interlace with the same MS wefts in each repeat and remain locked in position by other ones of the MS wefts. Interlacing of MS warps 13 24 with more than one MS weft W1, W4, W7, W10, W13, W16, W19, W22, W25, W28, W31, W34, W37, W40, W43, and W46 in a pattern repeat also improves dimensional stability and reduces shoving.

Each pair of the weft binder yarns, such as W5, W6 shown in FIG. 3, are interwoven with the PS warp yarns 1-12 such that together the paths of the two binder weft yarns as they interweave in the PS layer 110 is an analogue of that of an adjacent, but non-binding, weft yarn that follows the PS weave pattern repeat. In the illustrated example in FIG. 1, this is a plain weave. The paper side surface weave pattern is shown separately in the weave diagram in FIG. 4.

Figure 4:
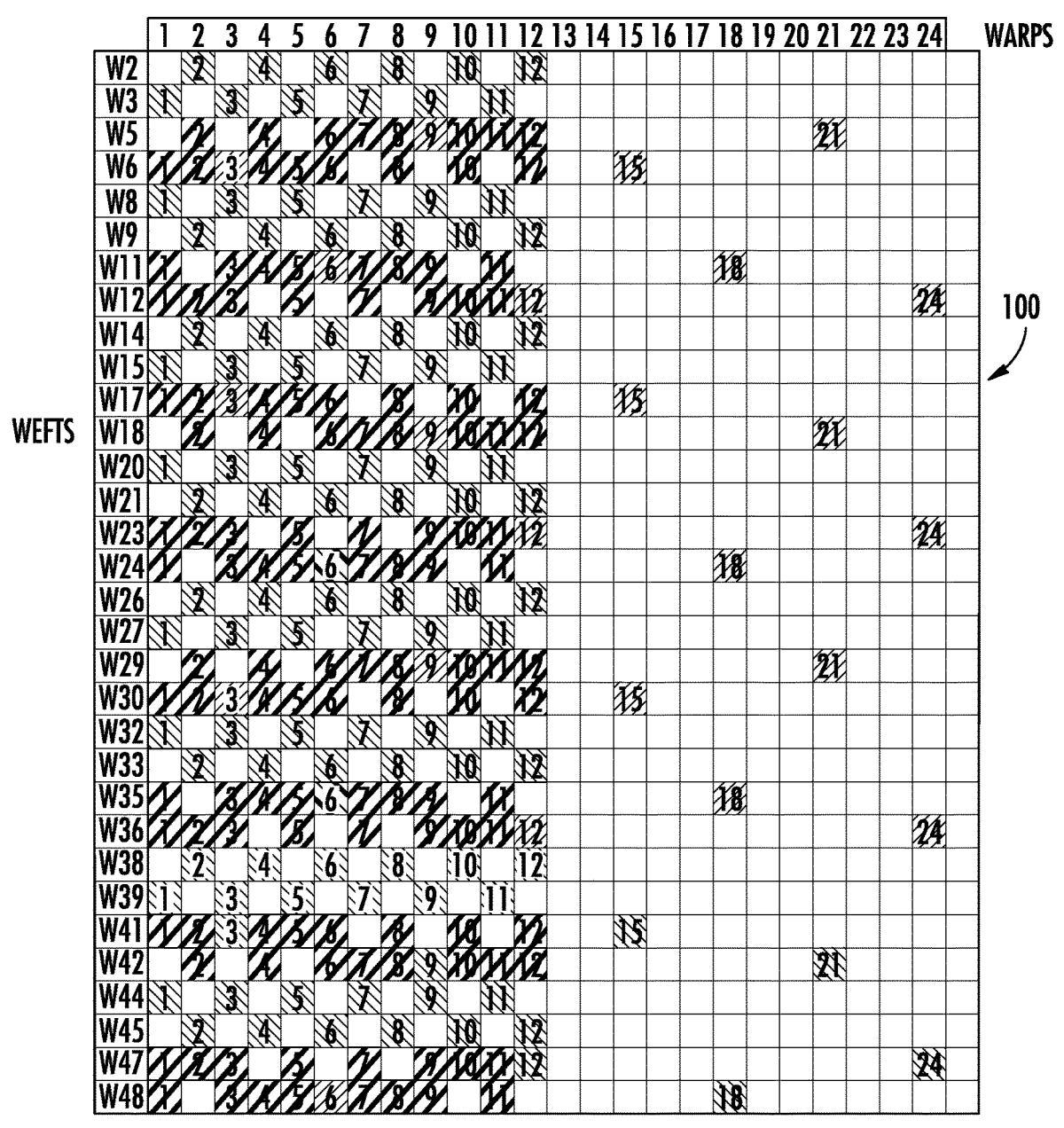

The interweaving pattern of the first pair of binder weft binder yarns W5 and W6 in FIG. 3 is shown by following the paths of the weave diagram of FIG. 1 or 4. Reading from the left, the binder weft yarn W5 passes over warp 1, under 2, over 3, under 4, over 5 and under the warps 6-12 to complete a first binder weft path in the PS surface. The binder weft yarn W5 also passes beneath MS warp 21 to bind the MS and PS layers together. The binder weft yarn W6 passes under the warps 1-6, over 7, under 8, over 9, under 10, over 11, and under warp 12 to complete the second binder weft path in the PS surface. Binder weft yarn W6 also passes beneath MS warp 15 to bind the MS and PS layers together. The paths of the remaining weft binder yarns are shown by the weave diagram in FIGS. 1 and 4.

Fabrics 100 woven according to the pattern shown in FIG. 1 will have 16 PS weft yarns, 16 binder weft yarns arranged as eight pairs (acting effectively as 8 PS weft yarns), and 16 MS weft yarns in each repeat of the weft yarns. The pattern shown will provide a fabric in which the ratio of PS weft yarns to MS weft yarns is effectively 3:2 (meaning there are effectively 24 PS wefts and 16 MS wefts in the pattern repeat). In other arrangements according to the invention, this can vary and a ratio of a number of PS weft yarns, including allowing for pairs of the binder weft yarns, to a number of MS weft yarns is in a range from 1:1 to 5:2 in one said pattern repeat of the fabric weave pattern. The fabrics will have a 1:1 warp ratio, with the PS and MS warps preferably being stacked. However, other ratios can be used for PS weft yarns to MS weft yarns as well as the PS warp yarns 1-12 and MS warp yarns 13-24. As shown, the number of MS wefts in a weave pattern is an integer multiple of the number of MS warps. However, other arrangements may be possible. As shown, the number of MS wefts per pattern repeat is less than the number of MS warps per repeat. However, other arrangements may be possible.

The fabric 100 is preferably woven in a 24 shed weave. However, depending on the specific weave pattern, a different number of sheds could be used.

Preferably the warps, the wefts, and/or the binder yarns are made of a polymeric material. The polymeric yarns are preferably made from at least one material selected from PET, PA, PBT, PEN, PPS or PEEK, or any other suitable hydrolysis resistant polymer having the desired strength and flexibility. The PS warps 1-12 preferably are round and have a diameter of 0.05 to 0.8 mm. They could also be ovate, elliptical, square or rectangular. The MS warp yarns 13-24 are preferably also round and have a diameter of 0.05 to 0.8 mm. They could also be ovate, elliptical, square or rectangular. Preferably, the MS warps 13-24 have a larger diameter than the PS warps 1-12. The PS wefts W2, W3, W8, W9, W14, W15, W20, W21, W26, W27, W32, W33, W38, W39, W44, W45 are round and have a diameter of 0.05 to 0.8 mm. They could also be ovate, elliptical, square or rectangular. The MS wefts W1, W4, W7, W10, W13, W16, W19, W22, W25, W28, W31, W34, W37, W40, W43, and W46 as well as the MS binder yarns W5, W6, W11, W12, W17, W18, W23, W24, W29, W30, W35, W36, W41, W42, W47, and W48 are preferably also round and have a diameter of 0.18 to 0.8 mm. They could also be ovate, elliptical, square or rectangular.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A composite forming fabric for a papermaking machine woven according to a repeating fabric weave pattern, comprising a paper side (PS) layer having a PS surface, the PS layer including PS warps and PS wefts interwoven in a first repeating pattern, a machine side (MS) layer having a MS surface, the MS layer including interwoven MS warps and MS wefts, and a plurality of pairs of binder weft yarns, each of the pairs of binder weft yarns comprising first and second binder weft yarns interwoven according to a binder weft pattern with the PS warps and the MS warps to bind the PS and MS layers together in the composite forming fabric, and each interchanges between the layers at exchange points, wherein in each pattern repeat of the fabric weave pattern:
   at each said MS weft, at least three of the MS warps pass under said MS weft, where said at least three of the MS warps along with a further single one of the MS warps that passes over said MS weft are co-located one adjacent to another, and the further single one of the MS warps that passes over said MS weft separates a first of the at least three MS warps from the others of said at least three MS warps, and
   each of the MS warps interlaces with at least two non-adjacent ones of the MS wefts.

2. The fabric according to claim 1, wherein in each said pattern repeat of the fabric weave pattern no two of the MS warps interlace with a same two of the MS wefts.

3. The fabric according to claim 1, wherein each of the binder weft yarns in the pairs of binder weft yarns interlace with only one MS warp yarn in each said pattern repeat of the fabric.

4. The fabric according to claim 1, wherein each of the binder weft yarns in the pairs of binder weft yarns interlace with up to three MS warp yarn in each said pattern repeat of the fabric.

5. The fabric according to claim 1, wherein an interweaving pattern of each of the binder weft yarn pairs in the PS layer forms a part of the first repeating pattern.

6. The fabric according to claim 1, wherein the number of MS warp yarns in one said pattern repeat of the fabric weave pattern is the same as a number of PS warp yarns in the same pattern repeat.

7. The fabric according to claim 1, wherein a ratio of a number of PS weft yarns, including allowing for pairs of the binder weft yarns, to a number of MS weft yarns is in a range from 1:1 to 5:2 in one said pattern repeat of the fabric weave pattern.

8. The fabric according to claim 1, wherein a cross-sectional shape of at least some of the warps, the wefts, or the binder yarns is selected from one of: generally circular, ovate, elliptical, square or rectangular.

9. The fabric according to claim 1, wherein at least one of the warps, the wefts, or the binder yarns are polymeric yarns made from at least one material selected from PET, PA, PBT, PEN, PPS or PEEK.

10. The fabric according to claim 1, wherein in each pattern repeat of the fabric weave pattern said at least three of the MS warps that are co-located along with the further single one of the MS warps that passes over said MS weft include exactly three of the MS warps.

* * * * *

UNITED STATES PATENT AND TRADEMARK OFFICE
CERTIFICATE OF CORRECTION

PATENT NO. : 10,767,310 B2
APPLICATION NO. : 15/750641
DATED : September 8, 2020
INVENTOR(S) : Derek Chaplin Page 1 of 1

It is certified that error appears in the above-identified patent and that said Letters Patent is hereby corrected as shown below:

In the Specification

In Columns 3 & 4, Lines 66-67 & 1-2, delete:
"Interlacing of MS warps 13
24 with more than one MS weft W1, W4, W7, W10, W13, W16, W19, W22, W25, W28, W31, W34, W37, W40, W43, and W46 in a pattern repeat also improves dimensional stability and reduces shoving."

And insert:
-- Interlacing of MS warps 13 – 24 with more than one MS weft W1, W4, W7, W10, W13, W16, W19, W22, W25, W28, W31, W34, W37, W40, W43, and W46 in a pattern repeat also improves dimensional stability and reduces shoving. --

Signed and Sealed this
Seventeenth Day of November, 2020

Andrei Iancu
*Director of the United States Patent and Trademark Office*